(12) United States Patent
Hysell et al.

(10) Patent No.: US 10,879,729 B2
(45) Date of Patent: Dec. 29, 2020

(54) BACKUP BATTERY SYSTEMS FOR TRAFFIC CABINETS

(71) Applicant: ZincFive, LLC, Tualatin, OR (US)

(72) Inventors: Tim Hysell, Tualatin, OR (US); Dan Sisson, Aumsville, OR (US); Mark William Slobodnik, Salem, OR (US); Jeffrey William Slobodnik, Salem, OR (US)

(73) Assignee: ZincFive, LLC, Tualatin, OR (US)

( * ) Notice: Subject to any disclaimer, the term of this patent is extended or adjusted under 35 U.S.C. 154(b) by 1153 days.

(21) Appl. No.: 14/591,848

(22) Filed: Jan. 7, 2015

(65) Prior Publication Data

US 2015/0115720 A1 Apr. 30, 2015

Related U.S. Application Data

(63) Continuation-in-part of application No. 13/117,061, filed on May 26, 2011, now Pat. No. 9,570,940.

(60) Provisional application No. 61/348,242, filed on May 26, 2010.

(51) Int. Cl.
| | | |
|---|---|---|
| *H01M 14/00* | (2006.01) | |
| *H01M 8/00* | (2016.01) | |
| *H01M 2/00* | (2006.01) | |
| *B61C 3/00* | (2006.01) | |
| *H02J 9/06* | (2006.01) | |
| *H01M 10/04* | (2006.01) | |
| *H01M 10/42* | (2006.01) | |
| *H02J 7/00* | (2006.01) | |

(52) U.S. Cl.
CPC ......... *H02J 9/061* (2013.01); *H01M 10/0436* (2013.01); *H01M 10/4207* (2013.01); *H02J 7/00* (2013.01); *H02J 9/065* (2013.01); *H02J 2207/20* (2020.01)

(58) Field of Classification Search
CPC .......... H02J 9/061; H02J 7/0052; H02J 9/065; H02J 2007/0059; H01M 10/0436; H01M 10/4207; Y10T 307/62; Y10T 307/625
USPC ...................................... 307/43–87, 100–108
See application file for complete search history.

(56) References Cited

U.S. PATENT DOCUMENTS

| | | | | |
|---|---|---|---|---|
| 5,315,533 | A * | 5/1994 | Stich ....................... | H02J 9/062 307/66 |
| 5,579,197 | A * | 11/1996 | Mengelt .................. | H02J 9/062 307/66 |
| 6,225,778 | B1 | 5/2001 | Hayama et al. | |
| 6,280,874 | B1 * | 8/2001 | Hensley .................. | E21B 17/10 429/98 |
| 7,808,402 | B1 | 10/2010 | Colby | |

(Continued)

OTHER PUBLICATIONS

U.S. Office Action dated Dec. 5, 2013 issued in U.S. Appl. No. 13/117,061.

(Continued)

*Primary Examiner* — Brandon S Cole
(74) *Attorney, Agent, or Firm* — Weaver Austin Villeneuve & Sampson LLP

(57) ABSTRACT

Backup battery systems for traffic cabinets that control traffic lights are provided herein. Backup battery systems include a controller operably coupled to 1 or more backup battery panels having rechargeable battery cells. Preferred systems can fit and operate entirely within the traffic cabinet. Monitoring and control of the backup system can be operable locally and remotely via internet cloud.

16 Claims, 6 Drawing Sheets

(56) References Cited

U.S. PATENT DOCUMENTS

| | | |
|---|---|---|
| 9,570,940 B2 | 2/2017 | Hysell et al. |
| 2004/0012371 A1 | 1/2004 | Ott et al. |
| 2004/0248001 A1* | 12/2004 | Hall ..................... H01M 2/025 |
| | | 429/176 |
| 2006/0097696 A1* | 5/2006 | Studyvin ............... H02J 7/0018 |
| | | 320/116 |
| 2006/0265853 A1 | 11/2006 | Povolny |
| 2007/0020516 A1 | 1/2007 | Yoon |
| 2007/0030171 A1 | 2/2007 | Cheevarunothai et al. |
| 2009/0066291 A1* | 3/2009 | Tien ..................... H02J 7/0016 |
| | | 320/118 |
| 2010/0275810 A1* | 11/2010 | Barbee ..................... B61C 3/02 |
| | | 105/50 |
| 2011/0136349 A1* | 6/2011 | Pikielny ............. H01R 13/6315 |
| | | 439/8 |
| 2011/0193482 A1 | 8/2011 | Jones |
| 2011/0291565 A1 | 12/2011 | Hysell et al. |
| 2014/0295244 A1* | 10/2014 | Gaikwad ............... H01M 6/181 |
| | | 429/124 |

OTHER PUBLICATIONS

U.S. Final Office Action dated Jul. 28, 2014 issued in U.S. Appl. No. 13/117,061.

U.S. Office Action dated Apr. 5, 2016 issued in U.S. Appl. No. 13/117,061.

U.S. Notice of Allowance dated Oct. 5, 2016 issued in U.S. Appl. No. 13/117,061.

\* cited by examiner

BACKUP BATTERY SYSTEMS FOR TRAFFIC CABINETS

CROSS-REFERENCE TO RELATED APPLICATIONS

This application claims priority to and is a continuation-in-part of U.S. application Ser. No. 13/117,061 filed May 26, 2011, and also claims priority to U.S. Provisional Application No. 61/348,242 titled Traffic Cabinet Battery, filed May 26, 2010, both of which are expressly incorporated by reference in their entireties.

FIELD OF THE INVENTION

The present invention generally relates to powering a traffic control cabinet during a failure of the primary utility power. Examples of a utility power failure can include a complete loss of the AC line power or the utility power is in such a state as to affect the reliability and function of the traffic cabinet components. More specifically, the invention provided herein relates to utilizing the unused space within a traffic control cabinet to house a complete and intelligent uninterruptible power supply (UPS) battery powered backup system.

BACKGROUND OF THE INVENTION

Traffic lights are electronic signaling devices positioned at various locations on roads, including intersections and crossings, to control the flow and direction of motorized vehicles, cyclists, and pedestrians. Most traffic light signaling is controlled by electronic circuitry housed in a nearby traffic cabinet and powered by a local electricity provider. When a power failure occurs, traffic lights go dark which creates an unsafe condition at the intersection or crossing as drivers and pedestrians are no longer being directed by traffic signaling. To avoid this situation, the power supply of some traffic cabinets is backed up with an Uninterruptible Power Supply (UPS) or Battery Backup System (BBS) system to power the traffic lights and controls during a power failure. In general, prior art UPS or BBS systems contain large lead-acid batteries and require an unnecessarily large amount of space near or against the traffic cabinet. As examples, a secondary cabinet is sometimes added to house the lead-acid batteries or the lead-acid batteries take up valuable rack space within the traffic cabinet.

Accordingly, most government agencies do not add a UPS system to their traffic cabinets because of the additional cost of the additional battery cabinet or the lack of additional rack space available in the cabinet. Additional reasons for not utilizing a UPS system are that tearing up the existing sidewalk to add another cabinet is expensive and the larger footprint on the sidewalk means less room for pedestrians and creates more of a hazard, especially for handicapped people, senior citizens, and young children. Additionally, the use of lead-acid batteries dictates a longer re-charge time and greatly increases maintenance issues. These problems are exacerbated during instances of prolonged use of the UPS system.

It is further noted that maintenance of lead-acid batteries is a major problem as most government agencies do not have the man-power nor the budgeted funds to perform the regular maintenance required to keep lead-acid batteries operating at rated capacity. More specifically, the lead-acid batteries in a large number of installed UPS systems are dead or are of very low capacity when called upon to power a traffic light. Disposing of and replacing dead lead-acid batteries also represents a significant cost for most traffic agencies using a power backup system. This problem is pronounced as lead-acid batteries are notorious for having short lives in backup traffic applications.

For the above reasons, there is a need for UPS systems for traffic control cabinets that can easily be installed in the existing cabinets and are intelligent so they can perform their own maintenance. UPS systems herein can advantageously include redundant components such that individual or even multiple power failures will not disrupt power flow and control of traffic signaling. In comparison to lead-acid batteries, the UPS systems herein can utilize a battery chemistry that has a higher energy density and longer life span, in addition to being safer and easier to recycle. Such systems would add enormously to the reliability and safety of traffic signals.

SUMMARY

Embodiments herein are directed to a backup battery system for a traffic cabinet that supplies power to a traffic light and having a battery panel comprising a plurality of rechargeable non lead-acid battery cells and having a thickness of 2 inches or less; an electronic controller operably coupled to the battery panel such that it can transmit power from the battery panel to the traffic cabinet in a sufficient amount to power the traffic light when there is a primary power failure; wherein the battery panel and the controller are configured to be positioned and operably functional within the traffic cabinet.

Further embodiments are directed to traffic cabinet system including a traffic cabinet having a side walls, a front door, an internal rack and operably coupled to a primary power source configured to supply power to a traffic light; a battery panel comprising a plurality of rechargeable battery cells; and an electronic controller operably coupled to the battery panel such that it can transmit power from the battery panel to the traffic cabinet in a sufficient amount to power the traffic light when there is a primary power failure; and wherein the battery panel and the controller are positioned and operably functional within the traffic cabinet.

In one aspect, a backup battery system is provided, wherein the backup battery system comprises a rechargeable, non-lead battery panel having a thickness of between 19.05 and 25.4 mm, a power output of 200 W or greater and having the flexibility to be configured into both a planar and parabolic position. The battery panel, in one embodiment, is comprised of a plurality of independent battery strings made of battery cells, each string individually having its own independent charging board configured to distribute the charging and discharging of its respective battery string. In one implementation, the multiple strings of batteries and their respective independent charging boards are operably coupled together by a central controller/inverter configured to control the power output of the battery panel as a whole such that it can turn each individual battery string on or off depending on overall power requirements of the battery panel and the power supply potential of one or more batteries strings. The controller/inverter may be configured to monitor power output of each battery string, such that it can detect problems in power output of each battery string. The controller/inverter may further be configured to operably connect the individual battery strings together either in series or in parallel, and to disconnect the individual battery strings from each other. In one implementation, at least one battery string is redundant and at least one battery string is a primary, such that if the primary battery string diminishes in its power output, the controller/inverter can activate the redundant battery string such that the power output of the battery panel as a whole is not diminished.

In some embodiments, the controller/inverter presents power output status information from the battery strings on a display screen for a user to view. The controller/inverter may monitor the total current into and out of the battery strings to determine the capacity of each battery string and can signal a charger board to charge its operably coupled battery string. In one implementation, the central controller/inverter continually recalculates the actual capacity of each battery string, using an algorithm based on the battery chemistry and monitors the temperature and voltage of the battery strings in order to ensure the battery strings are operating to achieve the highest capacity and longest life. In some implementations, the charging boards are operably coupled together to a single cable configured to couple to the central controller/inverter such that the charging boards can transmit data to the controller/inverter and can receive signaling commands from the controller/inverter.

In some embodiments, the controller/inverter monitors a primary power source and generates a template of utility power and uses it to compare incoming voltage waveform from the primary power source against such that if there is a preset difference between the template voltage waveform and the incoming voltage waveform for a certain amount of time, the controller/inverter will signal the backup battery to activate. In some implementations the system saves the incoming waveform of any power outage trigger event, and makes the waveform accessible by the user locally or remotely via the internet cloud. In one example, the controller/inverter samples the cable 100 times per cycle, looking for changes in the root mean square value of the battery panel's waveform and any abrupt changes in the wave shape.

In some embodiments, the controller/inverter can upon detecting a power failure in a central utility power activate the battery panel as a backup power source within 6 to 200 milliseconds. In some embodiments, the backup battery system further includes a plurality of described battery panels and operably coupled controllers/inverters each of which are accessible remotely by a software application on a computer such that status information is displayed on the computer to a user, and the user can enter in control commands to the controllers/inverters. In some implementations, the controllers/inverters are also accessible by a direct Ethernet port by a software application on a computer connected to the Ethernet port or remotely via the internet cloud.

In another aspect, a backup battery system is provided, where the system comprises a battery panel having a plurality of independent battery strings made of battery cells, each string individually having its own independent charging board configured to distribute the charging and discharging of its respective battery string.

In another aspect, a backup battery system is provided, where the system comprises a battery panel having a plurality of independent battery strings and independent charging boards operably coupled together by a central controller/inverter configured to control the power output of the battery panel as a whole such that it can turn each individual battery string on or off depending on overall power requirements of the battery panel and the power supply potential of one or more batteries strings.

In another aspect, a backup battery system is provided, where the system comprises a backup battery operably coupled to a controller/inverter, wherein the controller/inverter monitors a primary power source and generates a template of utility power and uses it to compare incoming voltage waveform from the primary power source against such that if there is a preset difference between the template voltage waveform and the incoming voltage waveform for a certain amount of time, the controller/inverter will signal the backup battery to activate. In some implementations the system saves the incoming waveform of any power outage trigger event, and makes the waveform accessible by the user locally or remotely via the internet cloud.

BRIEF DESCRIPTION OF THE DRAWINGS

The following figures are included as an aid to understanding various aspects of the invention. The invention may be better understood by referencing one or more of these drawings in combination with the detailed description of the parts and their functions. It will be appreciated that the drawings are not necessarily to scale, with emphasis instead being placed on illustrating the various aspects and features of embodiments of the invention, in which.

DETAILED DESCRIPTION OF THE INVENTION

Figure 1A:
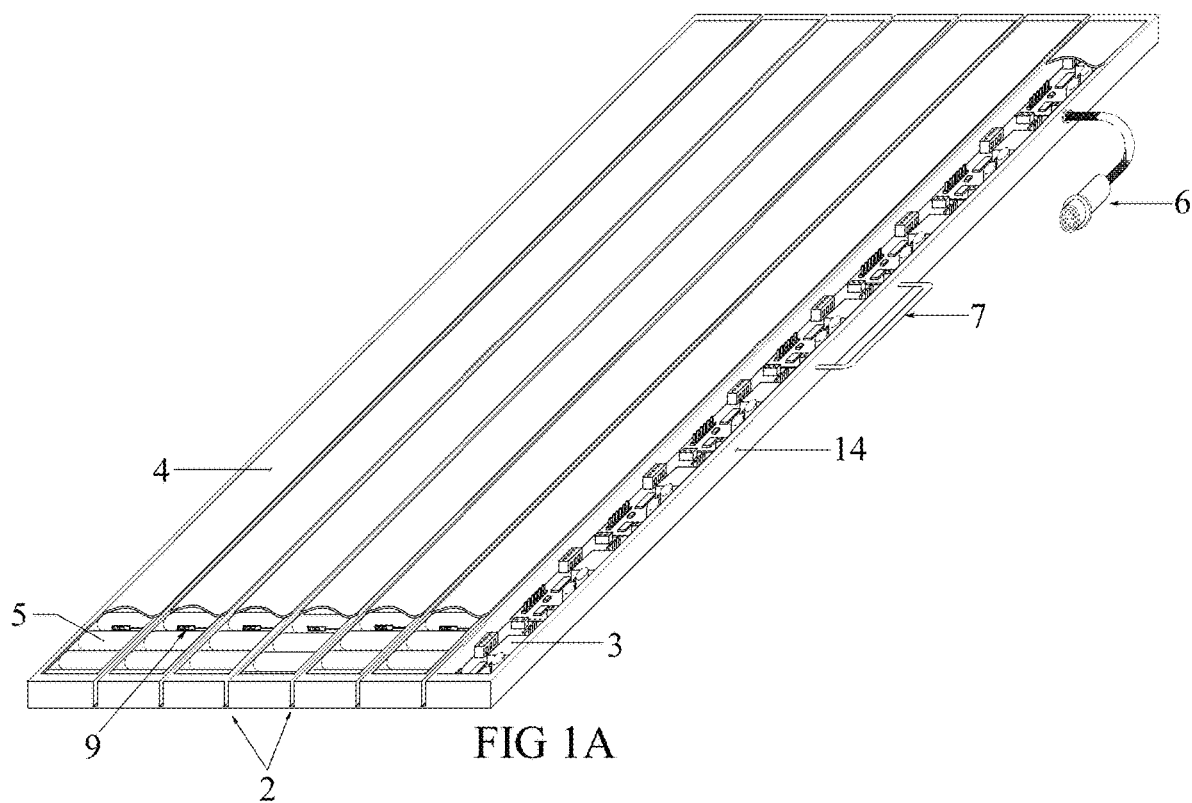
FIG. 1A is perspective view of a flexible battery panel in an unflexed configuration.

Embodiments of the present invention are described below. It is, however, expressly noted that the present invention is not limited to these embodiments, but rather the intention is that modifications that are apparent to the person skilled in the art and equivalents thereof are also included.

The present invention provides an intelligent battery backup system for positioning within traffic cabinets. In general, and as shown in the systematic view of FIG. 4 the battery systems herein includes a central controller/inverter 16 in operable connection with one or more battery panels 21, 30-33. The number of battery panels used in a given system is dependent upon the power needs of a given traffic cabinet and corresponding traffic lights under its control. The number and type of battery panels should be sufficient to power the traffic cabinet upon a main power supply failure. According to preferred embodiments each of the battery panels are configured and sized to fit within the inside of the traffic cabinet with the door closed. As discussed in the Background section above, lead-acid batteries which are currently used as traffic cabinet backup batteries cannot be easily installed within the inside of most existing traffic cabinets. This is because most traffic cabinets, such as the 332 cabinet and NEMA style cabinets provide very limited internal space beyond the space reserved for the existing cabinet components. Available space can include space between the mounting rail 11 and the side cabinet wall 12 and rack space, for example. Conventional lead-acid batteries are too large and will not fit within these spaces, which is why additional cabinets are often utilized for lead-acid battery backup systems. The systems herein can be installed within traffic cabinets without having to modify the cabinet itself.

Preferred battery cells 5 used with the battery panels herein can be any suitable type of rechargeable battery cell such as Ni-iron, Ni-cadmium, NiH2, NiMH, Ni-Zinc, Lithium based, and the like for example. More preferably the battery strings are 48VDC NiZn batteries. According to preferred embodiments, the battery cells 5 are not lead-acid based. According to even more specific embodiments, it is preferred that the battery cells used in the battery panels herein have a higher energy density than lead acid batteries and/or longer life spans. Preferably the battery panels herein can include a handle 7 to allow for easy installation and removal. The handle 7 is advantageously configured to be on the front side of the battery panel 14 when it is installed in the cabinet 10. Additionally the battery panels herein preferably include a connector cable 6 or other communicative/power transfer means between the battery panel and the central controller/inverter 16. The connector cable 6 allows data of various monitored parameters to be communicated to the controller/inverter 16 and a corresponding response from the controller/inverter 16 to the battery panel based on the value(s) of the monitored parameters. The connector cable 6 also allows for power to be transmitted from the battery panel to the central controller/inverter 16 during a primary power failure such that the controller/inverter 16 can redirect the backup power to the traffic cabinet and the traffic lights. The connector cable 6 is configured to plug into the converter/inverter 16 when the battery panel is positioned in the traffic cabinet. The connect cable 6 can also be configured to plug into a wall outlet with an adapter.

Figure 1B:
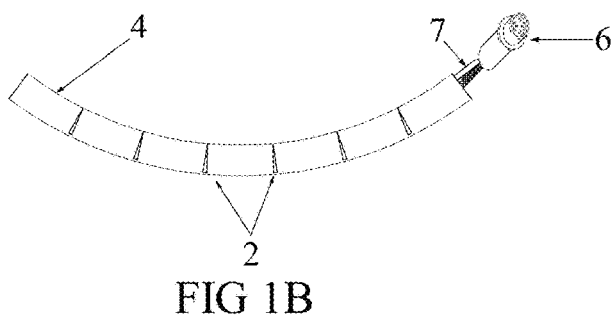
FIG. 1B is a side view of a flexible battery panel in a flexed configuration.
Figure 2B:
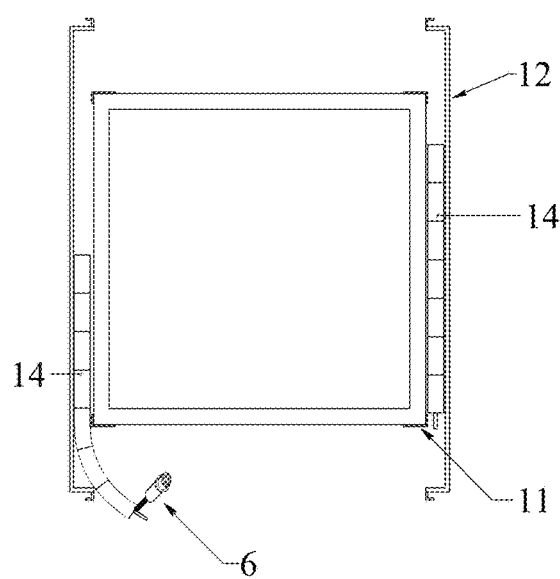
FIG. 2B is a top view of a 332 traffic cabinet.
Figure 2A:
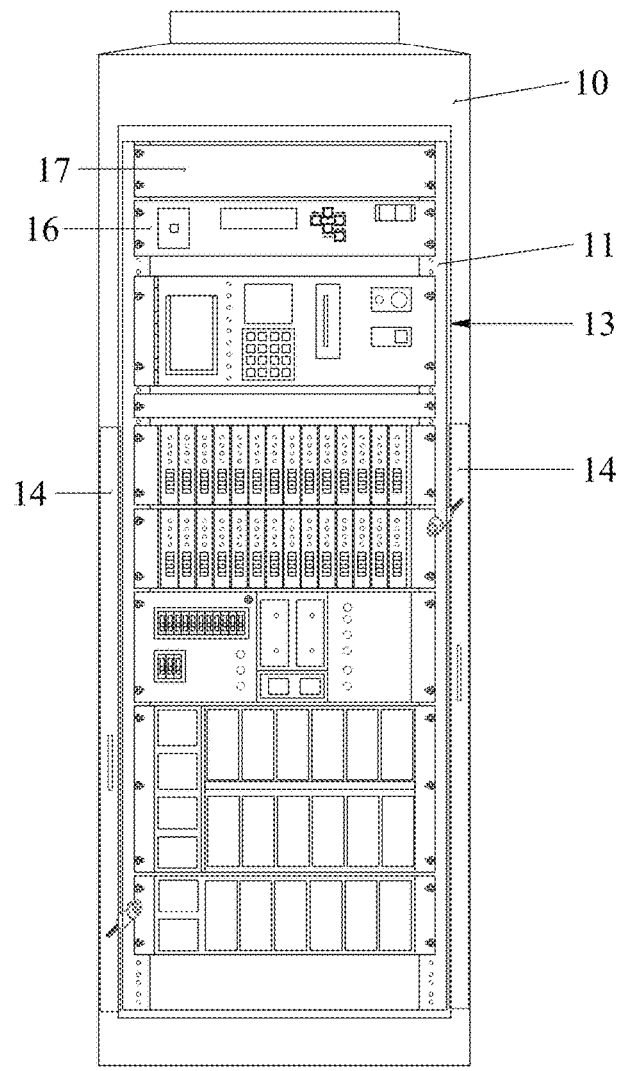
FIG. 2A is a front view of an opened 332 traffic cabinet.

The battery panels themselves can be designed and manufactured in several configurations to be installed in a desired traffic cabinet. According to one embodiment, one or more battery panels of the backup system can be a flexible battery panel 14 as shown in FIGS. 1A and 1B. The flexible battery panel is configured to have means for allowing the panel 14 to flex, such that it can be positioned into a curved configuration, such as shown in FIG. 1B. According to one embodiment, the casing of the battery panel is preferably made of a rigid material, or semi-rigid material, including plastic, such as a thermoplastic, and includes a plurality of slits 2 that define columns 4 that house strings of multiple battery cells 5. The slits 2 act as hinges to allow the battery panel 14 to flex. Other hinge configurations can also be used with the flexible battery panel. Advantageously, the flexible capacity allows the battery panel 14 to be inserted into the space between the mounting rails 11 and a side wall 12 of a traffic cabinet 10 as shown in FIGS. 2A and 2B. FIGS. 2A and 2B respectively depict a front and top view of a 332 traffic cabinet 10. FIG. 2A shows the cabinet 10 in an opened configuration where the door frame is defined by a perimeter 13. While the flexible battery panel 14 has the potential to be flexed it can also be used in an unflexed position. FIG. 2B shows two flexible battery panels 14 on both sides of a traffic cabinet 10, with the left side battery panel being in a flexed position while the right side battery panel is in an unflexed position. Preferably the flexible battery panel 14 is configured such that it has sufficient flexibility to fit between the mounting rail 11 and the side cabinet wall 12 and flex around a portion of the front face of the internal cabinetry components when the front door of the cabinet 10 is closed.

Figure 3:
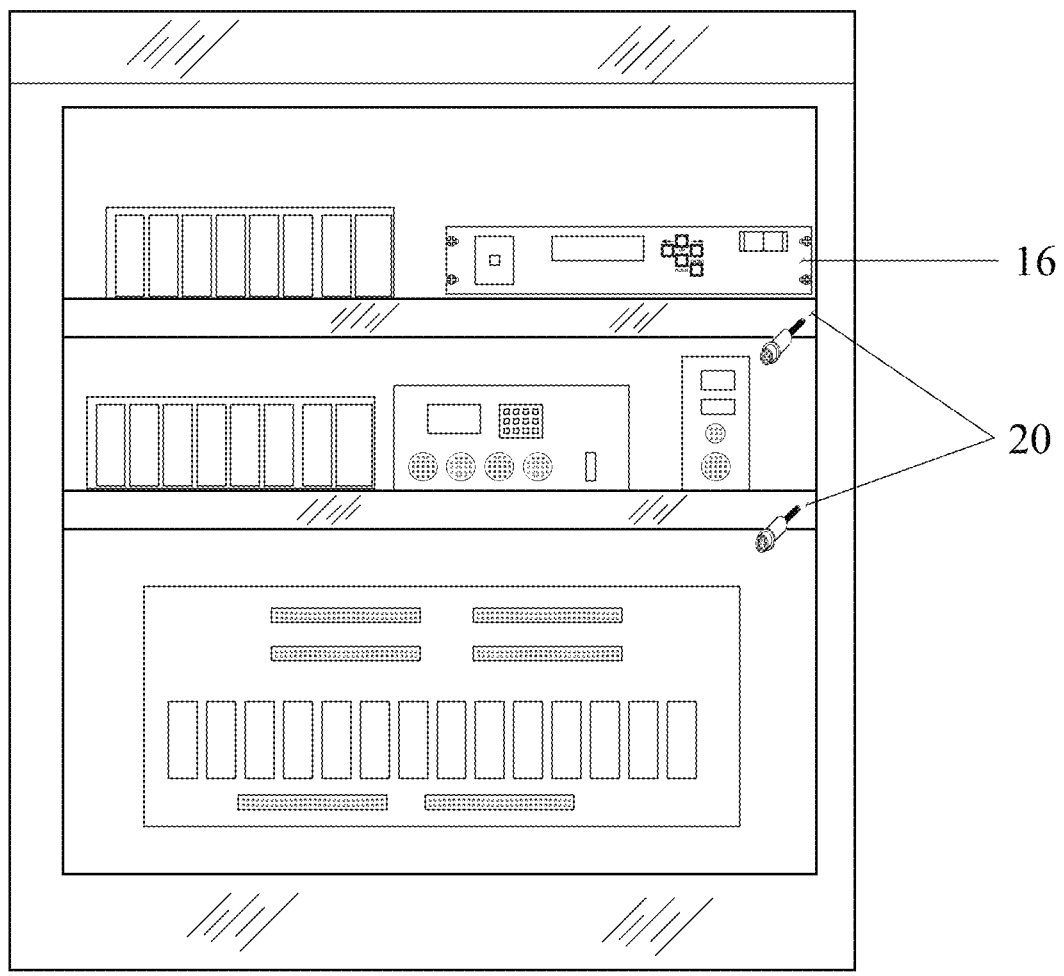
FIG. 3 is the front view of an opened NEMA style traffic cabinet.

In addition to the use of flexible battery panels 14, non-flexible battery panels 17 can also be installed within traffic cabinets as well. As shown in FIG. 2A, a non-flexible battery panel 17 can be installed on the mounting rack 11, such that it is parallel with the shelving for example. One or more battery panels 20 can also be used as shelves on a rack in a NEMA style traffic cabinet as shown in FIG. 3. For rack mounting embodiments, the battery panels 17 and 20 can be mounted to the rack itself, such as on a shelf or to define a shelf, and/or the components of the rack, such as the controller/invertor 16. Any suitable mounting means can be utilized to position the battery panels 17 and 20 in their respective cabinets, non-exclusively including screws, bolts, mounting hardware, and the like. As the battery panels utilized in the backup systems herein may need to be replaced or fixed, the mounting means used herein is preferably readily releasable, such that the battery panels are not welded to the traffic cabinet, for example. Alternatively, the panels 17 and 20 can simply be positioned on the rack without secured mounting. For battery panels installed between the rack 11 and cabinet side wall 12, such as the flexible battery panel 14, the battery can be wedged between these two surfaces such that they are secure. Alternatively, these battery panels can be mounted using any suitable mounting means. It should be noted that according to non-preferred embodiments and depending on the specific cabinet space and battery panels, flexible battery panels can be installed on the mounting rack 11 and non-flexible battery panels can be installed between the mounting rack 11 and the cabinet side wall 12. Additionally the battery panels can be mounted on the internal doors of the traffic cabinet. Due to the limited space within traffic cabinets, it is preferred that the battery panels provided herein have a thickness of 2 inches or less. The width and length of the battery panels should be of a dimension that allows for positioning at the desired location (e.g., rack, shelving, door, side) within the traffic cabinet and allows the traffic cabinet door to close.

Preferred battery panels and controller/inverters described in the backup systems herein can be configured and sized to be installed in all NEMA traffic cabinets including the following types: M, M36, MSX, MSX36, P40, P44, R40, R44. Additionally the systems provided herein are advantageously configured to be installed within 332 and 334 traffic cabinets.

Figure 4:
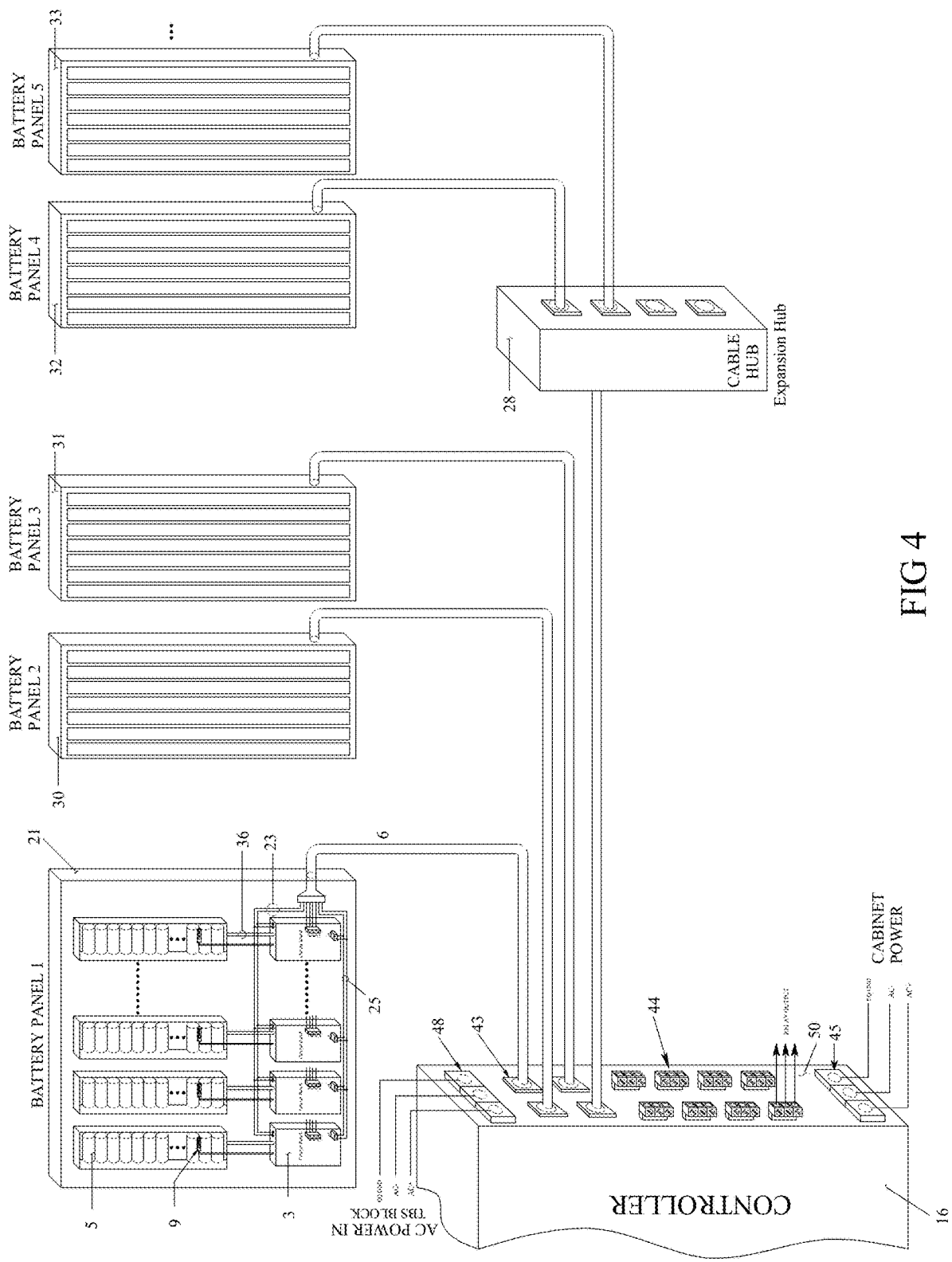
FIG. 4 a systematic view of a backup battery system.

As shown in cutaway views of the battery panel 14 shown in FIG. 1A and the battery panel 21 shown in FIG. 4, the battery panels utilized in the systems herein can advantageously be organized as several independent strings of battery cells 5, such that each string is operably coupled to its own battery charging board 3 such that the strings can individually be charged or discharged. Preferably 4-6 battery cell strings are used per panel 14. Preferred battery panels 14 have a power rating of 250-500 W. As the cutaway views of FIG. 1A, a plurality of battery charging boards 3 can be arranged as a column of the battery panel 14 that is positioned alongside, such as parallel to the columns 4 of battery cell 5 strings. Alternatively, and as shown in FIG. 4, the charging boards 3 can be aligned in a row perpendicular to the columns 4 of battery cell 5 strings. Each charging board 3 can include an operable electrical connection 36 to its respective battery cell 5 string to allow for charging or discharging and monitoring.

The charging boards 3 of the battery panels herein are preferably controlled by a controller/inverter 16. An output cable 23 can interconnect the multiple charger boards 3 and transmit monitored data, such as power capacity and/or temperature information, to the controller/inverter 16 via the connector cable 6. Advantageously, the outputs from all of the battery chargers 3 from a single battery panel are operably coupled together to provide one input to the controller/inverter 16 through the connector cable 6. The connector cable 6 can also provide AC power to the charger boards 3 through an interconnecting cable 25. The independence of the battery cell strings is advantageous in allowing one or multiple failures in the system and/or the batter panel while still allowing the system to provide sufficient backup power. This internal organization of the battery panels with independent chargers associated with each string of batteries is also advantageous in providing constant recharge times regardless of how many battery panels are added to the system. According to preferred embodiments, each charger board 3 is intelligent, such that the status of each string of batteries can be continually and/or constantly reported back to the controller/inverter 16 so instantaneous or near instantaneous system capacity can be determined. According to even further embodiments, the controller/inverter 16 can also be operably configured to turn on or shut down any string of batteries to configure the system for optimum operation.

Figure 5:
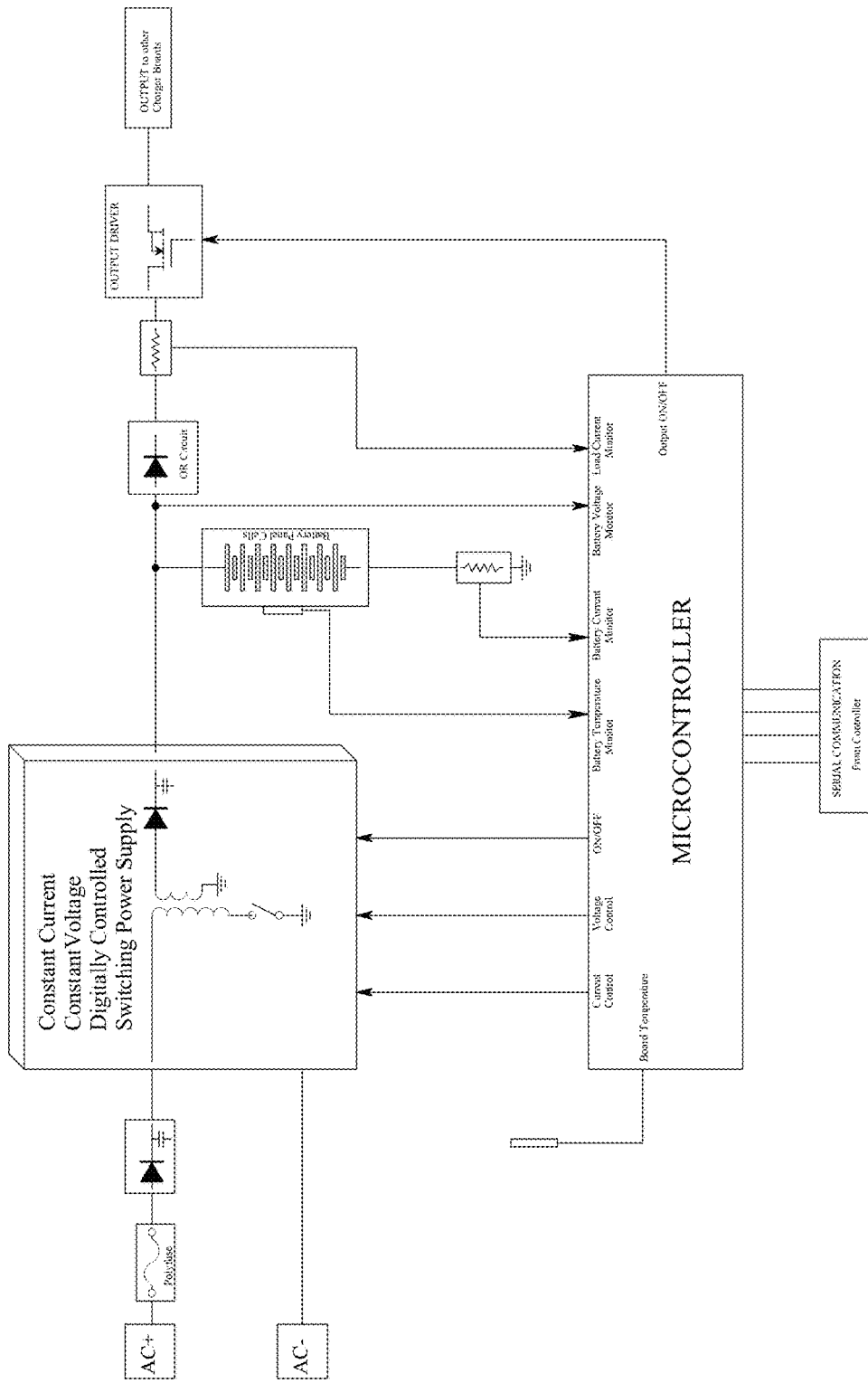
FIG. 5 is a block diagram of a battery charger board.

A block diagram of a preferred charger board and its relationship to other battery panels, a controller/inverter 16, and other charger boards is depicted in FIG. 5. While the charger boards 3 are configured to control the charging and discharging parameters of the battery cells 5, they are also preferably configured to control the battery panel connection to the main controller/inverter 16 via a connector cable 6. Charger boards 3 can also be configured to monitor other fluctuating features of the battery cells 5, non-exclusively including load current, battery current, battery voltage, and battery temperature. The status of these monitored features can be relayed to the controller/inverter 16 from the charger board 3 via a connector cable 6 for appropriate response if any by the controller/inverter 16. As one example, one or more temperature sensors 9 can be positioned a cell strings and operably coupled to the charger boards 3 via a connection cable or wire. This embodiment allows for the temperature of the battery cells 5 to be constantly and/or continuously monitored. Once temperature data is received, the controller/inverter 16 can adjust various parameters to accommodate for a temperature change. The charger board 3 temperature can also monitored to check for any kind of over current condition and can shut down the charger circuitry. For example, if the AC power load is too great to charge all of the battery panels at once, the controller/inverter 16 can select which panels are allowed to charge at a given time.

As stated above, the charger boards 3 communicate with the controller/inverter 6 through the battery panel connector cable 6. The controller/inverter 15 is preferably configured such that it can turn all of the battery chargers on or off simultaneously or individually depending on cabinet requirements over the serial communication port. Since each charger and its cells are preferably configured to be independent of each other, there is no theoretical limit to the number of battery panels that can be added to the system depending on the space made available by the traffic cabinet. Additionally, the recharge time of the system can be configured to be independent of the number of battery panels since each charger board 3 charges its own set of battery cells 5. Battery panels can readily be added or removed from the system, as desired, without disrupting the rest of the system.

According to advantageous embodiments, and as shown in FIG. 5, the battery charger board 3 will not enable the battery cells 5 to supply power to the controller/inverter 16 unless commanded by the controller/inverter 16. According to this embodiment, an unconnected battery panel would thus not have any battery voltage on its connector pins in the connector cable 6. This particular embodiment allows for safe "hot swapping" of the battery panels for repair or removal without disruption of the entire system.

The controller preferably is configured to control all of the charger boards 3 in each battery panel of the system and preferably contains or is otherwise operably coupled to an inverter which converts the battery voltage from the battery panels to 120V AC to be distributed to the traffic cabinet and the respective traffic lights it controls. The controller 16 preferably contains all of the intelligence to monitor and control the power within a traffic cabinet. More specifically, the controller 16 can be configured to monitor the status of all battery charger boards 3 and cells 5 and perform regular maintenance on said cells 5. The controller 16 can also be configured to calculate system capacity based upon cabinet load requirements. Still further embodiments allow for the controller 16 to organize and log all power failures and to control the traffic cabinet through its relay and power outputs. Advantageously, it is preferred that the controller 16 can communicate with a personal computer, such as a laptop or other serial interface to either transmit or receive data or to receive instructions from said computer. Based on the above functions of the controller 16, any suitable computer components can be utilized in the converter/inverter 16 to perform its functions, non-exclusively including a hard drive, software, processors, transmitting means, display, inputs, outputs, and memory storage.

Figure 6A:
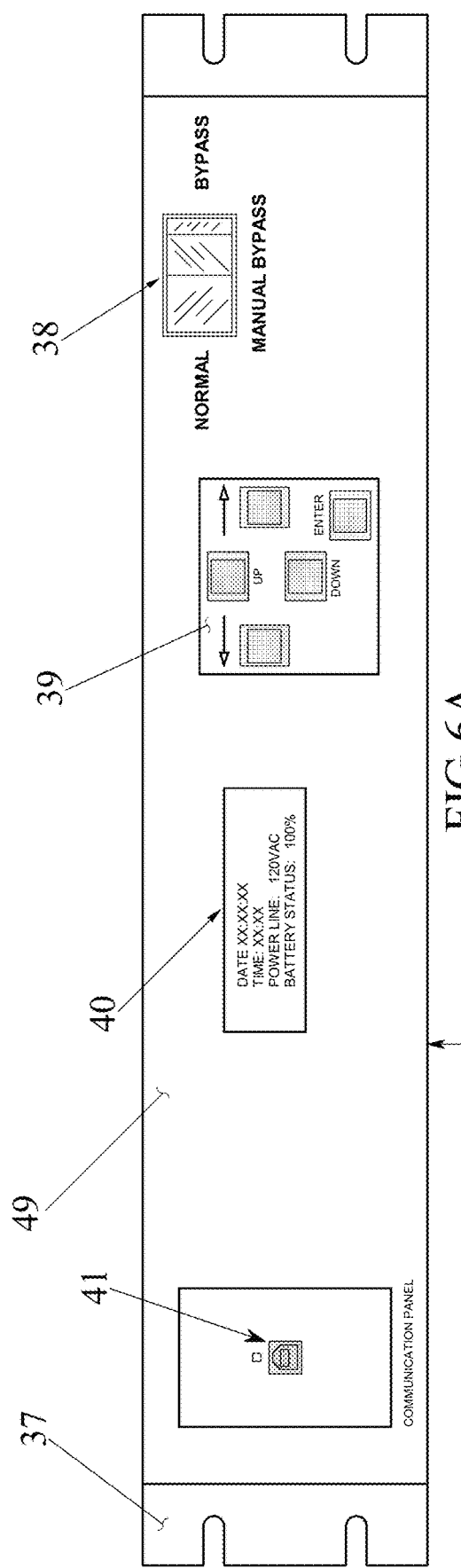
FIG. 6A is a front view of a controller and inverter.

The controller/invertor 16 can be mounted or positioned any suitable position within the traffic cabinet such that it can be communication with the battery panels of the system. FIG. 2A shows a controller 16 positioned in the rack 11 of a cabinet 10. FIG. 6A shows two rail mounting pieces 37 having grooves configured to fit on the rack 11. Additionally, the controller 16 can be positioned on a shelf or other components within a traffic cabinet. The controller 16 can be mounted or not, but when mounted can preferably include means for releasable attachment such that a user can easily install and remove the controller 16 from the cabinet.

Figure 6B:
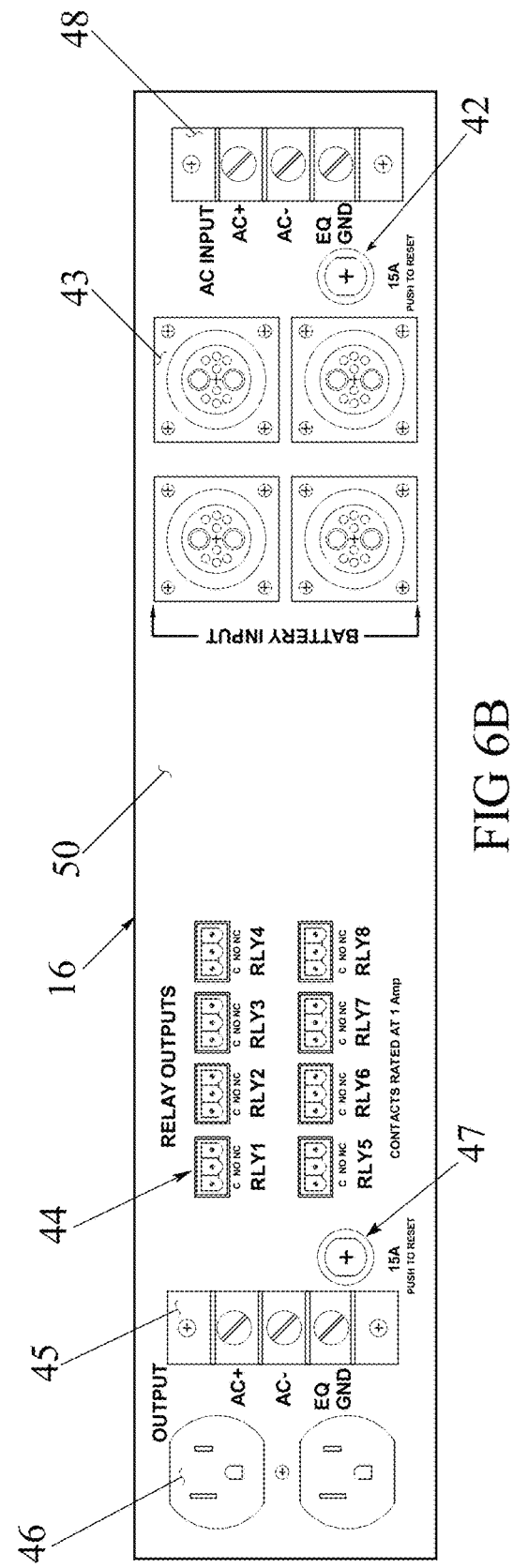
FIG. 6B is a rear view of a controller and inverter.

FIGS. 6A and 6B respectively depict the front and back panels of a preferred converter/inverter 16. With respect to the front panel 49, the controller 16 can include a manual bypass switch 38 which is configured to allow a user to bypass the automated default mode of the controller 16, if desired. User control or data entry into the controller can be transmitted through any suitable interface such as a keypad 39 or other control mechanism. Additionally or alternatively to a keypad, a user can utilize a computer, such as a laptop, to both transmit and receive information to and from the controller 16. More specifically, this can be done through any suitable port, such as a USB port 41 which can connect to a laptop or other computerized device. Monitored system data from the coupled battery panels and the controller 16 can be shown to a user via a display 40, such as an LCD display. Even more specifically, the LCD display can be a 4 line by 20 character display. As an example, the display can include important information such as date, time, power usage, battery status, temperature, and the like. Displayed information can likewise be transmitted for display on a user's computerized device.

Communication with the backup battery system can be accomplished through a network connection using standard secure internet protocols (TCP/IP), either remotely with a network connection or directly connecting through the controller/inverter's 16 ethernet port. In setting up a control system of backup battery systems, a user using a software application can give each backup battery panel 14 and controller/inverter 16 a name, and each controller/inverter 16 can have a IP address which identifies a specific cabinet. A Dynamic Host Configuration Protocol can be used with the controller/inverters 16 to assign an IP address from a DHCP service located on a network. The backup battery system can populate the network parameters with default values which can be overwritten and customized by a user. Signing into the software application to control the controller/inverter 16 can be done using secure means, such as a username and password. A user can designate which of the monitored parameters are actually sent/displayed to the user. Email or text messaging can also be set up to receive status monitoring from the controller/inverters 16. Geographical designation of a particular controller/inverter 16 can be assigned, preferably they are named after said designation, such as a street address (e.g., 123 Main St.), or street intersection (e.g., Main St/$5^{th}$ Ave).

Remote communication using a software application allows users to view and manage the backup battery system in real time as if they were actually psychically present at one or more particular cabinets. Thus an entire city, town, or neighborhood can be set up such that all or some of their traffic cabinets, back up batteries, and their associated traffic intersections are entered into a system that can be viewed and managed in real time from remote locations by DOTs or other designated users, using a software application on a computer. Using a graphical user interface from a computer application, a real-time intelligence can link a computer to view, monitor and manage the backup battery system's performance parameters, such as System Status, Cabinet Load, Run-times, AC Voltage, whether a backup battery panel is in A/C power mode or whether it is being used as a backup power source for the cabinet.

Through a remote or direct connection, a user can view status information from one or more battery panels 14 and 21, and 30-33 and their associated cabinets, including an individual intersection's power status, such as when utility power is lost, the battery charge status and runtimes of a individual intersection, real-time cabinet power consumption, the geographical location of a backup battery panels, an event log which allows users to diagnose system power failures, AC waveforms to help diagnose why an intersection went off-line, programmable parameters such as time and battery capacity relay triggers, voltage thresholds, and high/normal capacity—this will increase the battery 'depth of discharge' creating a longer intersection battery backup run time. The template waveform can be updated on an ongoing basis so users don't get false triggers as the wave shape slowly changes in the area. In a very noisy area, the waveform can be checked just for the RMS value.

Preferred embodiments are directed to backup battery systems where a user can program automated triggers that will signal the central controller/inverter 16 to activate/ deactivate particular battery strings within a backup battery panel 14. Certain triggers can non-exclusively include power failures of one or more battery strings, or battery panels, low and high A/C threshold values (setting low and high A/C voltage thresholds creates voltage parameters, which determine when the backup battery panel will be activated), temperature thresholds, battery capacity levels, a power outage that effects a particular traffic cabinet (thereby allowing the backup batteries to be used to power a traffic cabinet), the switch-over time after a power outage that the backup battery system will be activated, thereby allowing very slight delays (e.g., 6-200 msec) before the backup battery system is utilized for power, the day and time of day the power outage occurs. More than one relay trigger can be set on the controller/inverter 16 so that a user can define 2 or more trigger events to occur simultaneously before the backup battery system is controlled, whether by activation or deactivation of particular battery strings within a backup battery panel 14.

With respect to temperature thresholds, both an upper and lower temperature can be created. For example, if the cabinet reaches 120 degrees F., the backup batteries can be turned on. Likewise if the cabinet reaches 10 degrees F., the backup batteries can be turned on.

The controller/inverter 16 can preferably be used as an intelligent, two-Stage backup system. Stage one continuously monitors the power line and decides if the power available to the traffic cabinet is adequate for safe operation of the traffic cabinet. If utility (main) power is within the user defined parameter range, it can be routed through a transient suppression and filter module to clean up the incoming power. When utility power is outside of normal operating parameters, a power failure is detected, and the controller/inverter 16 can switch over to battery backup power through the panels 14. The switch-over time to backup battery power typically takes about 6 milliseconds but can be programmed up to 200 msecs according to preferred embodiments. During stage two, a digital sine wave monitoring system can be utilized. This system models the incoming sine wave in real time and detects sine wave abnormalities. User-settable thresholds/triggers allow the end-user to customize the sensitivity of the backup battery system to assure downstream equipment is completely protected from even the smallest power deviation. When the digital sine wave monitoring system detects an abnormality, the controller/inverter 16 switches the affected intersection's traffic cabinet to battery backup and the triggering sine wave can also be stored in the event log, along with a day/date time stamp. The stored waveform abnormality of the power line voltage can help in future analyzing power problems that may be causing equipment malfunctions With respect to FIG. 6B, a preferred rear panel 50 of the controller/inverter 16 is shown. Connector cables 6 from the battery panels in the system can be plugged into sockets 43 in the controller 16. As shown in FIG. 4, these sockets 43 can alternatively be coupled to a HUB 28 having more sockets to allow for more battery panels to be coupled to the controller 16, beyond the number of sockets 43 present on the controller 16. The rear panel 50 can also include a plurality of relay outputs 44 to control various functions in the traffic cabinet. Input power to the controller 16 can be received from a terminal block 48 and power sockets 43. Power can be transmitted to the traffic cabinet from the controller 16 through a terminal block 45 and one or more power receptacles 46. Input and output circuit breakers 42 and 47 having reset capabilities can also be present on the controller 16. It is expressly noted that features and controls of the controller 16 can be interchanged and moved from the positions shown in FIGS. 6A and 6B including front and real panel interchangeability where suitable.

The invention may be embodied in other specific forms besides and beyond those described herein. The foregoing embodiments are therefore to be considered in all respects illustrative rather than limiting, and the scope of the invention is defined and limited only by the appended claims and their equivalents, rather than by the foregoing description.

What is claimed is:

1. A backup battery system comprising a rechargeable, non-lead battery panel having a thickness of between 19.05 and 25.4 mm, a power output of 200 W or greater and having the flexibility to be configured into both an unflexed planar and flexed non-planar position, wherein the battery panel comprises a casing made of rigid or semi-rigid material, the casing having at least one part-way slit and forming a living hinge, thereby providing the flexibility along the at least one part-way slit.

2. The backup battery system of claim 1, wherein the battery panel is comprised of a plurality of independent battery strings made of battery cells, each string individually having its own independent charging board configured to distribute the charging and discharging of its respective battery string.

3. The backup battery system of claim 2, wherein the multiple strings of batteries and their respective independent charging boards are operably coupled together by a central controller/inverter configured to control the power output of the battery panel as a whole such that it can turn each individual battery string on or off depending on overall power requirements of the battery panel and the power supply potential of one or more batteries strings.

4. The backup battery system of claim 3, wherein the controller/inverter is configured to monitor power output of each battery string, such that it can detect problems in power output of each battery string.

5. The backup battery system of claim 4, wherein the controller/inverter is configured to operably connect the individual battery strings together either in series or in parallel, and to disconnect the individual battery strings from each other.

6. The backup battery system of claim 4, wherein at least one battery string is redundant and at least one battery string is a primary, such that if the primary battery string diminishes in its power output, the controller/inverter can activate the redundant battery string such that the power output of the battery panel as a whole is not diminished.

7. The backup battery system of claim 4, wherein the controller/inverter presents power output status information from the battery strings on a display screen for a user to view.

8. The backup battery system of claim 3, wherein the controller/inverter monitors the total current into and out of the battery strings to determine the capacity of each battery string and can signal a charger board to charge its operably coupled battery string.

9. The backup battery system of claim 8, wherein the central controller/inverter continually recalculates the actual capacity of each battery string, using an algorithm based on the battery chemistry and monitors the temperature and voltage of the battery strings in order to ensure the battery strings are operating to achieve the highest capacity and longest life.

10. The backup battery system of claim 8, wherein the charging boards are operably coupled together to a single cable configured to couple to the central controller/inverter such that the charging boards can transmit data to the controller/inverter and can receive signaling commands from the controller/inverter.

11. The backup battery system of claim 3, wherein the controller/inverter monitors a primary power source and generates a template of utility power and uses it to compare incoming voltage waveform from the primary power source against such that if there is a preset difference between the template voltage waveform and the incoming voltage waveform for a certain amount of time, the controller/inverter will signal the backup battery to activate.

12. The backup battery system of claim 11, wherein the system saves the incoming waveform of any power outage trigger event, and makes the waveform accessible by the user locally or remotely via the internet cloud.

13. The battery panel of claim 11, wherein the controller/inverter samples the cable 100 times per cycle, looking for changes in the root mean square value of the battery panel's waveform and any abrupt changes in the wave shape.

14. The backup battery system of claim 3, wherein the controller/inverter can upon detecting a power failure in a central utility power activate the battery panel as a backup power source within 6 to 200 milliseconds.

15. A backup battery system of claim 3, further comprising a plurality of said battery panels and operably coupled controllers/inverters each of which are accessible remotely by a software application on a computer such that status information is displayed on the computer to a user, and the user can enter in control commands to the controllers/inverters.

16. The backup battery system of claim 15, wherein the controllers/inverters are also accessible by a direct Ethernet port by a software application on a computer connected to the Ethernet port or remotely via the internet cloud.

* * * * *